US006672321B2

(12) United States Patent
Hamilton

(10) Patent No.: US 6,672,321 B2
(45) Date of Patent: Jan. 6, 2004

(54) APPARATUS FOR CONTAINING AND CENTERING OXYGEN BOTTLE ON A WALKER

(76) Inventor: Roger H. Hamilton, 114 Atkinson Ave., Syracuse, NY (US) 13207

( * ) Notice: Subject to any disclaimer, the term of this patent is extended or adjusted under 35 U.S.C. 154(b) by 42 days.

(21) Appl. No.: 10/037,207

(22) Filed: Jan. 4, 2002

(65) Prior Publication Data

US 2003/0127121 A1 Jul. 10, 2003

(51) Int. Cl.[7] .............................. A61H 3/04; B60R 9/06

(52) U.S. Cl. ........................... 135/67; 135/66; 224/407; 224/42.39; 280/47.35

(58) Field of Search .............................. 135/65, 67, 85, 135/66; 280/47.35, 304.1; 297/188.02; 224/407, 42.39

(56) References Cited

U.S. PATENT DOCUMENTS

| | | | | | |
|---|---|---|---|---|---|
| 1,313,959 | A | * | 8/1919 | Smith | 224/42.39 |
| 3,970,344 | A | * | 7/1976 | Baumann | 297/188.02 |
| 4,045,044 | A | | 8/1977 | Bierer | |
| 4,251,044 | A | | 2/1981 | Olson | |
| 4,266,765 | A | | 5/1981 | Sandoval et al. | |
| 4,312,505 | A | | 1/1982 | Engelhart | |
| 4,431,206 | A | * | 2/1984 | Pryor | 280/304.1 |
| 4,506,903 | A | * | 3/1985 | Bowermaster | 280/304.1 |
| 4,800,910 | A | * | 1/1989 | Gamm | 135/67 |
| 4,974,760 | A | * | 12/1990 | Miller | 135/67 |
| 5,012,963 | A | * | 5/1991 | Rosenbaum | 224/407 |
| 5,253,760 | A | * | 10/1993 | Miller | 224/901.4 |
| 5,476,432 | A | | 12/1995 | Dickens | |
| 5,513,789 | A | * | 5/1996 | Woods et al. | 135/67 |

FOREIGN PATENT DOCUMENTS

| | | | |
|---|---|---|---|
| FR | 2547721 | * | 7/1983 |
| WO | WO 01/32123 | * | 5/2001 |

* cited by examiner

*Primary Examiner*—Winnie Yip
(74) *Attorney, Agent, or Firm*—Wall Marjama & Bilinski LLP

(57) ABSTRACT

A walker for providing a patient having a breathing disorder the ability to carry an oxygen bottle safely upon the walker. The walker has a pair of side frames having front vertical bars that are connected by a pair of cross members. Wheels are attached to the front bars of the frame for propelling the walker. An open top canvas bag containing the oxygen bottle is suspended from the top cross member so that the center of gravity of the bottle lies in a common vertical plane with the wheel axis and is centered between the frames. Stabilizers are provided to prevent the bottle from moving side to side or out of the frame.

14 Claims, 2 Drawing Sheets

APPARATUS FOR CONTAINING AND CENTERING OXYGEN BOTTLE ON A WALKER

FIELD OF THE INVENTION

This invention relates generally to a walker and, in particular, to a walker that provides additional mobility to a patient having a breathing problem that requires the use of oxygen.

BACKGROUND OF THE INVENTION

Many patients and, in particular, elderly patients, have breathing disorders that necessitate the use of oxygen. In certain extreme cases, the patient must have oxygen for breathing available at all times and, in particular, when the patient is exerting him or herself, as for example, when walking. Oxygen bottle caddies on wheels are presently available for transporting oxygen bottles. However, these devices require the use of one of the patient's hands to propel the bottle, thus rending them impractical for use when the patient must also use a walker to get about. Attempts to mount an oxygen bottle upon a walker have been proven to be less than satisfactory because the bottle typically renders the walker unstable and extremely difficult to manage. This, in turn, can pose a dangerous situation for an elderly or weak patient which can lead to a potentially damaging fall.

SUMMARY OF THE INVENTION

It is, therefore, an object of the present invention to improve walkers that are used by patients requiring the use of breathing oxygen.

It is a further object of the present invention to provide for the safety of patients who require the use of both oxygen and a walker when moving from place to place.

It is a still further object of the present invention to mount an oxygen bottle upon a walker in a stable condition that will not impede the user's ability to safely control the walker.

These and other objects of the present invention are attained by a walker for providing a patient with a breathing problem with additional mobility. The walker includes a pair of side frames that are cojoined in a spaced apart relationship by a pair of cross members. An open top container capable of supporting an oxygen bottle is hung from the center of one of the cross members so that the center of gravity of the bottle lies in a common plane with the wheels of the walker. Stabilizing straps are attached to the container and are secured to the two side frames to prevent the container and thus the oxygen bottle from moving out of the commonly shared frame with the wheels.

BRIEF DESCRIPTION OF THE DRAWING

For a better understanding of these and other objects of the present invention, reference will be made to the following detailed description of the invention which is to be read in association with the accompanying drawings wherein.

DETAILED DESCRIPTION OF THE INVENTION

Figure 1:
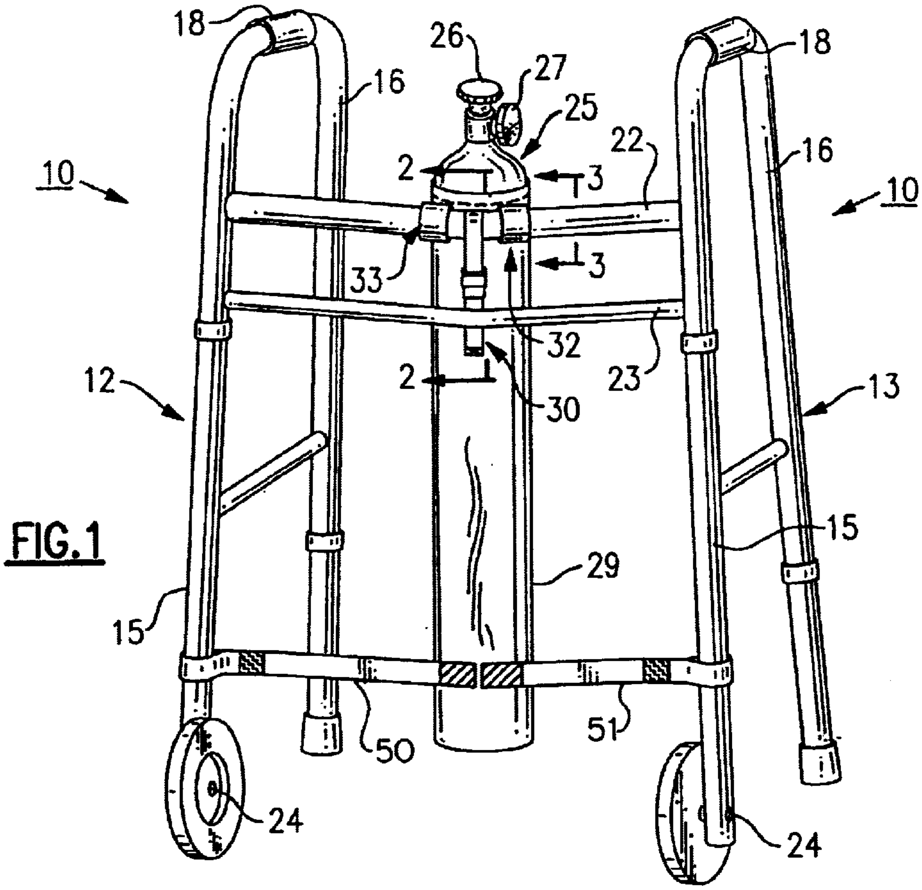
FIG. 1 is a front perspective view of a walker embodying the teachings of the present invention.

Turning now to FIG. 1, there is illustrated a walker, generally referenced 10, that embodies the teachings of the present invention. The walker is of typical construction and includes a pair of side frames 12 and 13. Each side frame is of similar construction and includes a vertically disposed front leg 15 and a vertically disposed rear leg 16. A horizontally disposed handrail 18 is integrally joined to the front and rear legs and provides a means by which a patient can securely grip and control the walker when situated between the two side frames. A lower rail 20 also extends between the front and rear legs of each frame to provide additional strength to the walker.

The two side frames are supported in a spaced apart relationship by an upper cross member 22 and a lower cross member 23 which are secured between the two front legs of the frame. The rear section of the walker remains open so that a patient using the walker can pass in an unobstructed manner between the two side frames. Each of the side frames is equipped with a wheel 21 that is rotatably supported upon a shaft 24 that is mounted in the lower part of the front leg. In assembly, the two shafts and the two cross members lie close to or actually within a common vertical plane.

Figure 4:
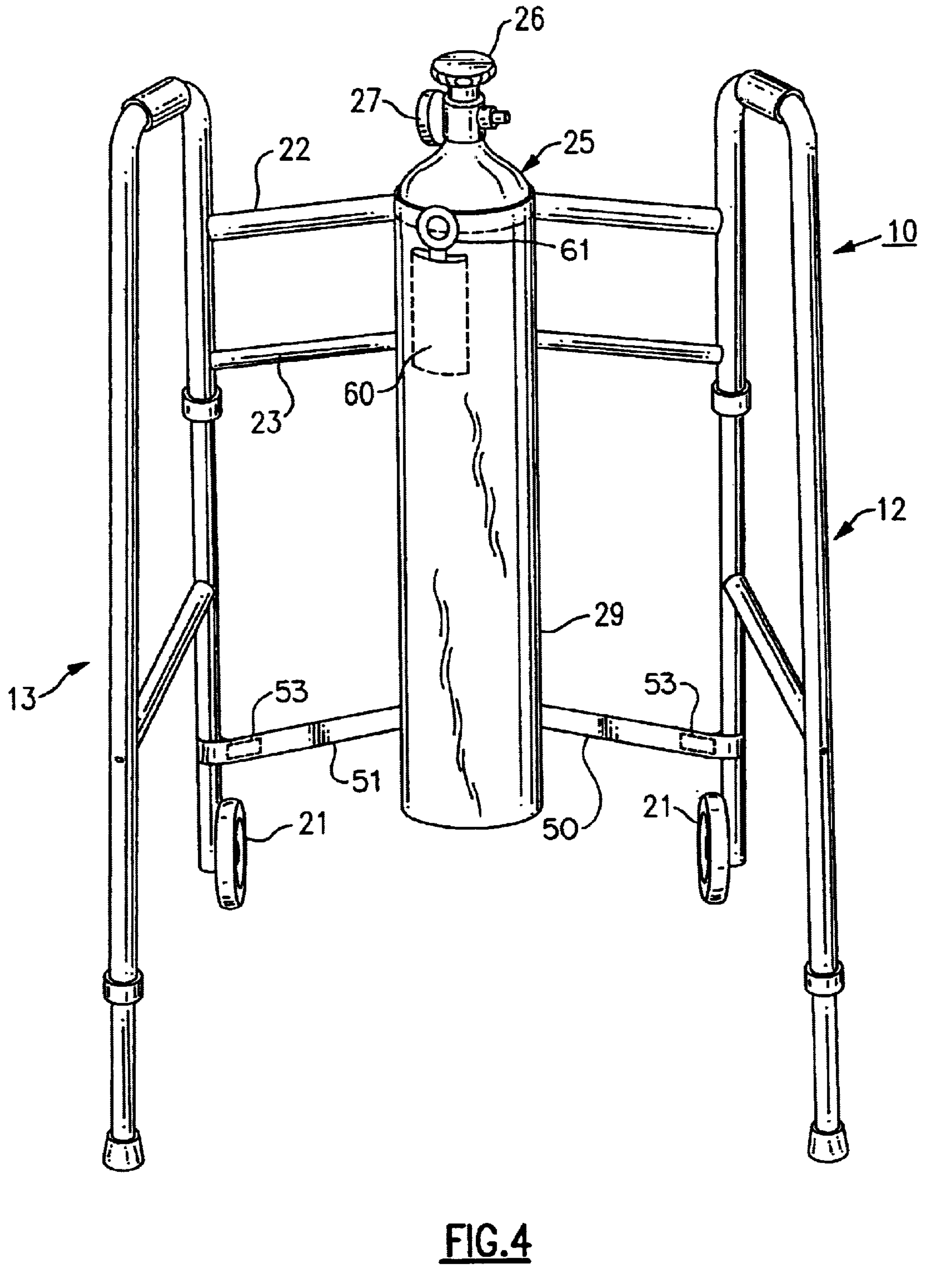
FIG. 4 is an enlarged rear perspective view of the walker.

A container, preferably in the form of an open top canvas bag 29, is suspended from the upper cross member of the walker as best illustrated in FIGS. 1 and 4. The canvas bag is of a size and shape such that it can hold a standard size oxygen bottle 25 that is slidably inserted into the bag through the top opening. A close sliding fit is provided between the bottle and the bag so that the bottle is snugly supported within the bag. The length of the bag is such that the upper part of the bottle protrudes through the top opening whereby the regulator 26 and gauges 27 associated with the bottle are exposed and thus easily accessible to one using the walker.

Figure 3:
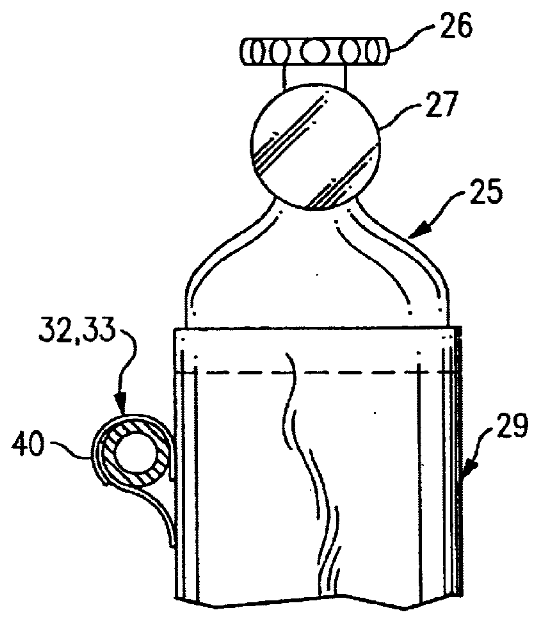
FIG. 3 is a further partial sectional view taken along lines 3—3 in FIG. 2.

The bag is suspended from the top cross member 22 of the walker by three two-piece hanger straps which include a center strap 30, and two smaller side straps 32 and 33 spaced to either side of the center strap. The two extreme ends of each strap are sewn into the bag and the free ends of the straps are joined by releasable fasteners. In assembly, the bag is centered upon the upper cross member between the two side frames and each of the side straps are looped over the cross member 22 and their free ends are tightly fastened together using a VELCRO® type fastener 40 as illustrated in FIG. 3. To pull the bag securely against the cross member, the VELCRO® fastener includes a hook pad that is sewn into one of the strap's free ends and an elongated loop pad that is sewn into the free end of the other strap.

Figure 2:
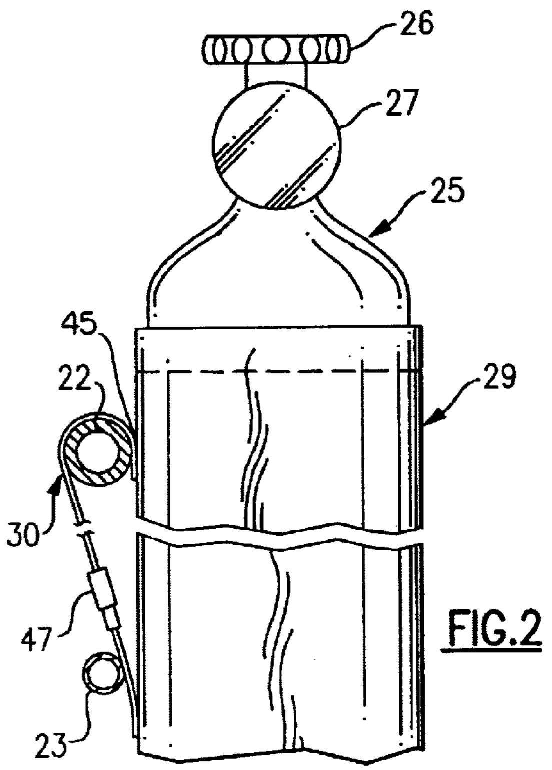
FIG. 2 is a partial sectional view taken along lines 2—2 in FIG. 1.

The two side straps are primarily used to hold the canvas bag centered between the side frames and to stabilize the top section of the bag. The center strap, on the other hand, is designed to support the main weight of the bag and the bottle. The center strap contains a first top piece 45 that has one end sewn into the bag so that the top piece can loop over the upper cross member 22 as illustrated in FIG. 2. The bottom piece of the center strap has one end sewn into the bag so that this end of the strap extends well below and behind the lower cross member 23 of the frame when the top piece is looped over the upper cross member. As illustrated in FIG. 2, the two free ends of the center strap are cojoined by a heavy duty buckle 47. The strap parts 30 and the buckle are fabricated of high strength materials so that the strap is well able to support the container and the bottle in an upright position upon the upper cross members.

The bottom section of the bag is further stabilized by a pair of lower stabilizing straps 50 and 51. Each strap has one end sewn into the lower part of the bag and is of sufficient length so that the opposite ends of the strap can be looped around the lower part of one of the front legs of the walker as illustrated in FIGS. 1 and 4. Here again, VELCRO® fasteners 53 are employed to fasten the free end of each strap upon itself. The fastener, for example, may have a hook pad sewn into the free end of the strap and an elongated loop pad sewn into a length of its body section so that the strap can be pulled taut and then closed to hold the bag centered between the side frames.

As should now be evident, the bottle's center of gravity is located equidistance between the two side frames of the walker and lies about or within the vertical plane of the wheel shafts. A patient using the walker needs simply to tip up the rear legs of the walker about the axis of the wheels and propel the walker in a forward direction. Because the center of gravity of the bottle lies in a vertical plane that passes through or very close to the axis of the wheel, the walker can be easily tipped and propelled forwardly without much more exertion than that produced by a walker that is not equipped with an oxygen bottle. It should be further noted that because the bottle is stabilized in this centered position, there is no tendency of the walker to tip from side to side and it can be safely turned around corners without tipping over.

As illustrated in FIG. 4, an open top pouch 60 is also sewn into the bag about opposite the location of the strap fastener 30. One or more tools 61 associated with the oxygen bottle can be conveniently stored in the pouch so that they are readily available in the event some adjustment must be made to the regulator and other parts of the oxygen system while the walker is in use.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A walker for providing a patient with a breathing disorder additional mobility, wherein said walker comprises:

a pair of side frames, each of said side frames including a vertically disposed front leg and a vertically disposed rear leg, a horizontally disposed hand rail connecting the upper sections of the front and rear legs and a horizontally disposed lower rail connecting the lower sections of the front and rear legs, upper and lower cross members connecting the front legs of the two side frames and supporting the frames in a spaced-apart relationship, an elongated cylindrical open top container sized for snugly containing an oxygen bottle, hanger means for suspending said container in a vertical plane from one of said cross members so that the container and a contained oxygen bottle are each centered between the side frames, said hanger means including a first top hanger strap secured to said container for securing and hanging said container to the center of said upper cross member and second and third top hanger straps secured to said container on each side of said first top hanger strap, each of said hanger straps being secured to said upper cross member within the periphery of said elongated cylindrical container, and stabilizing means for centering the bottom of said elongated cylindrical container relative to the side frames and for preventing the container from moving out of the vertical plane.

2. The walker of claim 1, wherein each front leg further includes a wheel rotatably attached thereto by which the walker may be propelled over a substrate.

3. The walker of claim 2, wherein said elongated open-top container is a flexible bag that provides a close sliding fit with a contained oxygen bottle.

4. The walker of claim 3, wherein said first top hanger strap is a two-piece strap with a first end of each piece being secured to said container on either side of the upper cross member and a second free end of each piece having a removable fastener for conjoining said free ends of said pieces whereby said cross member is captured between said container and said first top hanger strap.

5. The walker of claim 4 wherein said releasable fastener includes a high strength buckle.

6. The walker of claim 4, wherein said second and third top hanger straps are each two-piece straps-mounted on each side of said first top hanger strap, each of said second and third top hanger straps having one end of each piece being secured to said container and a second free end of each piece being releasably fastened by a hook pad and a coacting loop pad.

7. The walker of claim 3, wherein said stabilizing means further includes first and second stabilizing straps, each of said straps having a first end secured to the bottom of said container a body section having a length, and a second free end of each stabilizing strap looping about the front leg of the side frame respectively and a releasable fastener connecting said second free end of each stabilizing strap to the body section of said stabilizing strap.

8. The walker of claim 7 wherein said releasable fastener includes a hook pad and a coacting loop pad.

9. The walker of claim 3 that further includes a tool pouch secured to the bag.

10. An oxigen bottle supporting apparatus used with a walker, said apparatus comprising a cylindrical elongated open-top flexible bag sized for snugly containing a cylindrical oxygen bottle therein;

hanger means for suspending said bag in a vertical plane from a cross member of said walker such that the bag and a contained oxygen bottle are each centered between a pair of side frames of said walker, said hanger means including a first hanger strap secured to said bag for securing a and hanging said bag to the center of a cross member of said walker and second and third hanger straps secured to said bag on each said first hangers strap, each of said hanger straps being secured to a cross member of the walker within a periphery of the cylindrical bag; and stabilizing means for centering the bottom of said elongated open top bag relative to side frames of said walker and for preventing the flexible bag and contained oxygen bottle from moving out of a mounted vertical plane said stabilizing means including first and second stabilizing straps, each of said stabilizing straps being secured at one end to the bottom of said bag, and having a length so that an opposite end of each said of straps can loop a front member of the walker, and an adjustable connecting means for attaching the opposite end of each stabilizing strap back onto an intermediate portion of the length of said strap after looping the front member of the walker.

11. The apparatus of claim 10, wherein each of said second and third hanger straps are two-piece straps in which one end of each piece is secured to said bag on either side of a cross member of said walker and including a removable connector at a free and of each piece for cojoining the tree ends of said pieces whereby said cross member is captured beneath said straps.

12. The apparatus of claim 11, wherein the removable connector includes a hook pad secured to one piece and a loop pad secured to the other piece.

13. The apparatus of claim 10, wherein said adjustable connecting means includes a hook pad and a loop pad being secured to a common side of said strap and spaced apart from each other a given distance.

14. The apparatus of claim 11, further including a tool pouch secured to said bag.

* * * * *

UNITED STATES PATENT AND TRADEMARK OFFICE

CERTIFICATE OF CORRECTION

PATENT NO. : 6,672,321 B2

DATED : January 6, 2004
INVENTOR(S) : Roger H. Hamilton

It is certified that error appears in the above-identified patent and that said Letters Patent is hereby corrected as shown below:

Column 4,
Line 56, after the word “An” please delete “oxigen” and replace with -- oxygen -- and Line 65, after the word “securing” please delete the word “a”.

Column 6,
Line 5, after the words “cojoining the” please delete the word “tree” and replace with the word -- free --.

Signed and Sealed this

Ninth Day of March, 2004

JON W. DUDAS
*Acting Director of the United States Patent and Trademark Office*